United States Patent
Chen et al.

(10) Patent No.: US 9,361,544 B1
(45) Date of Patent: Jun. 7, 2016

(54) MULTI-CLASS OBJECT CLASSIFYING METHOD AND SYSTEM

(71) Applicant: INSTITUTE FOR INFORMATION INDUSTRY, Taipei (TW)

(72) Inventors: Yen-Lin Chen, Taipei (TW); Chuan-Yen Chiang, Nantou County (TW); Chao-Wei Yu, Pingtung County (TW); Augustine Tsai, Taipei (TW); Meng-Tsan Li, Taichung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 74 days.

(21) Appl. No.: 14/562,787

(22) Filed: Dec. 8, 2014

(30) Foreign Application Priority Data

Dec. 3, 2014 (CN) .......................... 2014 1 0724928

(51) Int. Cl.
*G06K 9/46* (2006.01)
*G06K 9/68* (2006.01)
*G06K 9/62* (2006.01)
*G06T 5/00* (2006.01)
*G06T 5/40* (2006.01)
*G06T 3/20* (2006.01)

(52) U.S. Cl.
CPC ............ *G06K 9/6256* (2013.01); *G06K 9/4609* (2013.01); *G06K 9/4642* (2013.01); *G06K 9/6228* (2013.01); *G06K 9/6277* (2013.01); *G06T 3/20* (2013.01); *G06T 5/003* (2013.01); *G06T 5/40* (2013.01);

(Continued)

(58) Field of Classification Search
CPC . G06K 9/6256; G06K 9/6228; G06K 9/4642; G06K 9/6277; G06K 9/00664; G06K 9/00711; G06T 3/20; G06T 5/003; G06T 5/40; G06T 2207/10004; G06T 2207/20081; G06T 2207/20201; G06F 17/30265; G06F 17/30247; H04N 1/40062

USPC ......... 382/100, 162, 167, 276, 286, 291, 261, 382/254, 260, 274, 130, 128, 181, 190, 195, 382/205, 172, 168, 104, 216, 209, 141, 145, 382/149, 224, 227, 159; 348/571, 148, 169, 348/537, 572, 521, E5.073, E5.009, 348/E5.011, E5.021; 250/559.44, 330; 358/518; 356/429, 4.01, 3.1
See application file for complete search history.

(56) References Cited

U.S. PATENT DOCUMENTS 7,769,228 B2 * 8/2010 Bahlmann ............ G06K 9/6228 382/155
7,899,253 B2 * 3/2011 Porikli ............... G06K 9/00369 382/159

(Continued)

*Primary Examiner* — Sheela C Chawan
(74) *Attorney, Agent, or Firm* — CKC & Partners Co., Ltd.

(57) ABSTRACT

A multi-class object classifying method and system are disclosed herein, where the multi-class object classifying method includes the following steps: classes, first training images and second training images are received and stored, and first characteristic images and second characteristic images are respectively extracted from the first training images and the second training images; the first training images is used to generate classifiers through a linear mapping classifying method; a classifier and the second characteristic images are used to determine parameter ranges corresponding to the classes and a threshold corresponding to the classifier. When two of the parameter ranges overlap, the remaining parameter ranges except for the two overlapped parameter ranges are recorded; after another classifier is selected from the classifiers except for the classifier that has been selected, the previous steps is repeated until the parameter ranges don't overlap with each other and the parameter ranges are recorded.

18 Claims, 5 Drawing Sheets

(52) U.S. Cl.
CPC ............... *G06T 2207/10004* (2013.01); *G06T 2207/20081* (2013.01); *G06T 2207/20201* (2013.01)

(56) References Cited

U.S. PATENT DOCUMENTS

| | | | | |
|---|---|---|---|---|
| 8,244,044 B2 * | 8/2012 | Hua | ..................... | G06K 9/4647 382/190 |
| 8,687,851 B2 * | 4/2014 | Hua | ..................... | G06K 9/00677 382/103 |
| 8,725,660 B2 * | 5/2014 | Forman | ................ | G06F 17/3071 382/159 |
| 8,761,498 B1 * | 6/2014 | Wu | ..................... | G06K 9/00624 382/159 |
| 8,781,218 B2 * | 7/2014 | Jia | ........................ | G06K 9/6256 382/159 |
| 9,112,984 B2 * | 8/2015 | Sejnoha | ............ | H04M 1/72519 |

* cited by examiner

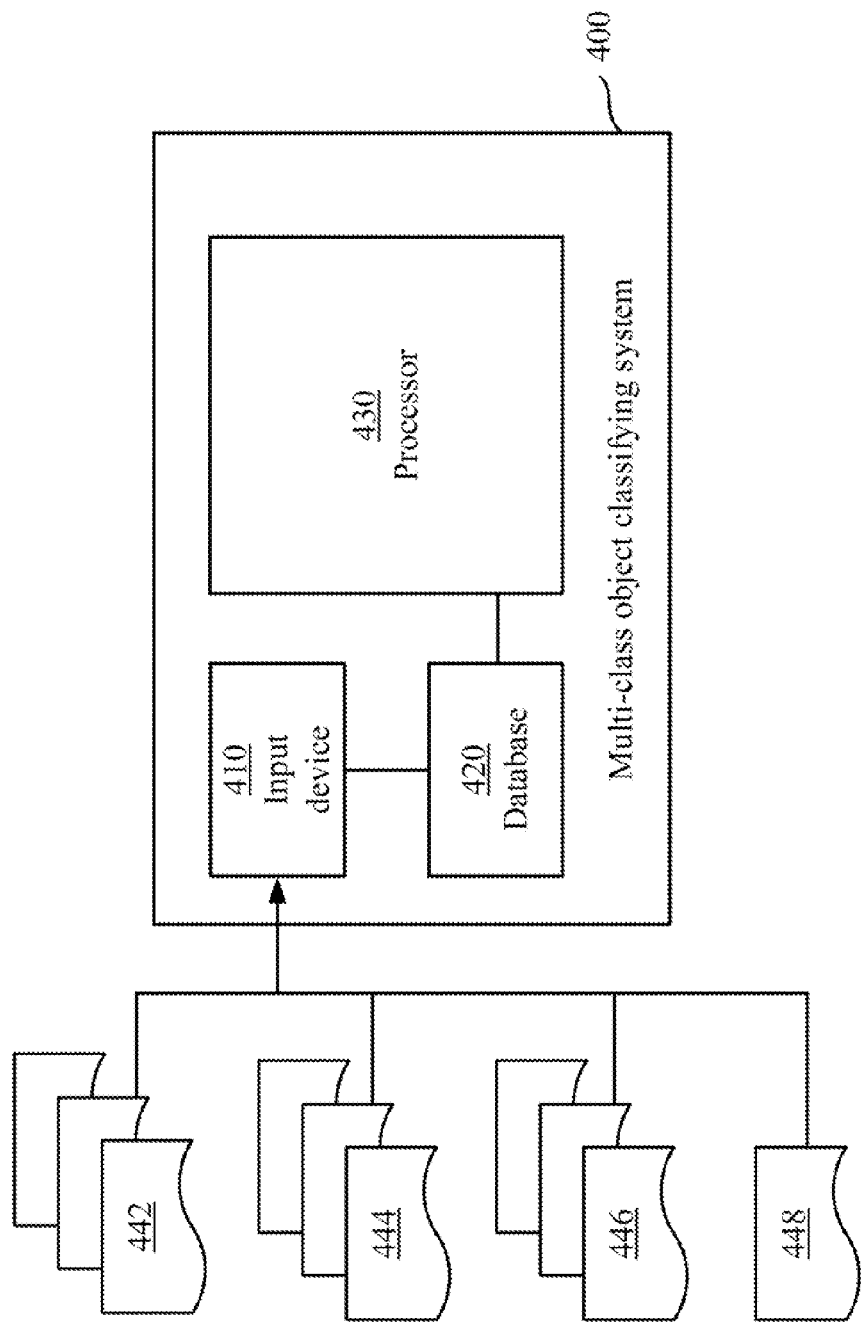

MULTI-CLASS OBJECT CLASSIFYING METHOD AND SYSTEM

RELATED APPLICATIONS

This application claims priority to China Application Serial Number 201410724928.4, filed Dec. 3, 2014, which is herein incorporated by reference.

BACKGROUND

1. Field of Invention

The disclosure relates to a classifying technology. More particularly, the disclosure relates to a multi-classifying object classifying method and system.

2. Description of Related Art

In the well-known pattern recognizing application of artificial intelligence or computer vision, the multi-class object classification often directly uses multi-class classification, or binary classification to solve a lot of binary classification problems divided from the multi-class classification. Directly performing multi-class classification, for example: boosting algorithm, uses multiple stage voting to gradually classify the target object by analyzing all the representative points of the input images; because the involved calculation is more complicated, more time-consuming and less accurate, the multi-class classification is not a good solution; however, the binary classification often encounters problems that there are too many pending characteristic points of images and the time of calculation is excessively long when different objects are in a near distance, so there is still room for improvements. In addition, conventionally binary classification can merely distinguish a single class through a process of classification in optimism condition; if the number of the classes is huge, the number of the classification process has to increase to distinguish every class and results in a lower efficiency of the classification.

SUMMARY

In order to improve the efficiency of the binary classifying method with regard to multi-class object classification, an aspect of the present disclosure provides a multi-class object classifying method, which including the following steps: (a) a plurality of classes, a plurality of first training images and a plurality of second training images are received and stored, and a plurality of first characteristic images are extracted from the first training images; the first training images is used to generate a plurality of classifiers corresponding to the classes through a linear mapping classifying method, wherein the first training images and the second training images respectively correspond to the classes; (b) a plurality of second characteristic images are extracted from the second training images and a classifier is selected from the classifiers; (c) the classifier and the second characteristic images are used to determine a plurality of parameter ranges corresponding to the classes and a threshold corresponding to the classifier; (d) when two of the parameter ranges overlap, the remaining parameter ranges are recorded except for the two parameter ranges; after another classifier is selected from the classifiers except for the classifier that has been selected, the step (c) is repeated until the parameter ranges don't overlap with each other; (e) when the parameter ranges don't overlap with each other, the parameter ranges are recorded; (f) a pending image is received and stored and a pending characteristic image is extracted from the pending image; a classifier and the pending image are used to determine a pending parameter; (g) when the pending parameter is larger than the threshold corresponding to the classifier, the pending image is classified into the class corresponding to the classifier; (h) when the pending parameter lies in the parameter ranges, the pending image is classified into the classes corresponding to the parameter ranges.

In an embodiment of the present disclosure, wherein the step (a) further includes: the first characteristic images are divided into a plurality of characteristic blocks, and a plurality of variances of the characteristic blocks is calculated; a plurality of characteristic variances in decrement order beginning with a maximum of the variances and the characteristic blocks corresponding to the characteristic variances are selected; the characteristic blocks are used to generate a plurality of classifiers corresponding to the classes through the linear mapping classifying method.

In an embodiment of the present disclosure, wherein the linear mapping classifying method is support vector machine (SVM) algorithm; the parameter ranges and the threshold are all between −1 and 1.

In an embodiment of the present disclosure, wherein the steps (a), (b), and (f) include: the first characteristic images are extracted from the first training images through histogram of oriented gradients (HOG); the second characteristic images are extracted from the second training images through histogram of oriented gradients; the pending characteristic image is extracted from the pending image through histogram of oriented gradients.

In an embodiment of the present disclosure, wherein the step (d) includes: when the two parameter ranges overlap, the remaining parameter ranges are recorded except for the two parameter ranges; after one of the two classifiers corresponding to the two parameter ranges is selected as said another classifier, the step (c) is repeated until the parameter ranges don't overlap with each other.

In an embodiment of the present disclosure, wherein the first training images include a plurality of positive sample images and a plurality of negative sample images; there is an object respectively corresponding to the classes in the positive sample images, and there is a lack of the object respectively corresponding to the classes in the negative sample images.

Another aspect of the present disclosure provides a multi-class object classifying system, which includes an input device, a database and a processor, wherein the database is coupled to the input device and the processor is coupled to the database. The input device receives a plurality of classes, a plurality of first training images, a plurality of second training images and a pending image, wherein the first training images and the second training images respectively correspond to the classes. The database stores the classes, the first training images, the second training images and the pending image. The processor executes following steps: (a) a plurality of first characteristic images are extracted from the first training images; the first training images are used to generate a plurality of classifiers corresponding to the classes through a linear mapping classifying method, wherein the first training images and the second training images respectively correspond to the classes; (b) a plurality of second characteristic images are extracted from the second training images and a classifier is selected from the classifiers; (c) the classifier and the second characteristic images are used to determine a plurality of parameter ranges corresponding to the classes and a threshold corresponding to the classifier; (d) when two of the parameter ranges overlap, the remaining parameter ranges are recorded except for the two parameter ranges; after another classifier is selected from the classifiers except for the classifier that has been selected, the step (c) is repeated until the parameter ranges don't overlap with each other; (e) when the parameter ranges don't overlap with each other, the parameter ranges are recorded; (f) a pending image is received and stored and a pending characteristic image is extracted from the pending image; a classifier and the pending image are used to determine a pending parameter; (g) when the pending parameter is larger than the threshold corresponding to the classifier, the pending image is classified into the class corresponding to the classifier; (h) when the pending parameter lies in the parameter ranges, the pending image is classified into the classes corresponding to the parameter ranges.

In an embodiment of the present disclosure, wherein the processor divides the first characteristic images into a plurality of characteristic blocks, calculates a plurality of variances of the characteristic blocks, selects a plurality of characteristic variances in decrement order beginning with a maximum of the variances and the characteristic blocks corresponding to the characteristic variances, and uses the characteristic blocks to generate a plurality of classifiers corresponding to the classes through the linear mapping classifying method.

In an embodiment of the present disclosure, wherein the linear mapping classifying method is support vector machine algorithm; the parameter ranges and the threshold are all between −1 and 1.

In an embodiment of the present disclosure, wherein the processor extracts the first characteristic images from the first training images through histogram of oriented gradients, extracts the second characteristic images from the second training images through histogram of oriented gradients, and extracts the pending characteristic image from the pending image through histogram of oriented gradients.

In an embodiment of the present disclosure, wherein when the two parameter ranges overlap, the processor records the remaining parameter ranges except for the two parameter ranges; after selecting one of the two classifiers corresponding to the two parameter ranges as said another classifier, the processor repeats the step (c) until the parameter ranges don't overlap with each other.

In an embodiment of the present disclosure, wherein the first training images include a plurality of positive sample images and a plurality of negative sample images; there is an object respectively corresponding to the classes in the positive sample images, and there is a lack of the object respectively corresponding to the classes in the negative sample images.

Another aspect of the present disclosure provides a non-transitory computer-readable storage medium storing a program that is loaded and executed by a computer, performs a multi-class object classifying method, which includes: (a) a plurality of classes, a plurality of first training images and a plurality of second training images are received and stored, and a plurality of first characteristic images are extracted from the first training images; the first training images is used to generate a plurality of classifiers corresponding to the classes through a linear mapping classifying method, wherein the first training images and the second training images respectively correspond to the classes; (b) a plurality of second characteristic images are extracted from the second training images and a classifier is selected from the classifiers; (c) the classifier and the second characteristic images are used to determine a plurality of parameter ranges corresponding to the classes and a threshold corresponding to the classifier; (d) when two of the parameter ranges overlap, the remaining parameter ranges are recorded except for the two parameter ranges; after another classifier is selected from the classifiers except for the classifier that has been selected, the step (c) is repeated until the parameter ranges don't overlap with each other; (e) when the parameter ranges don't overlap with each other, the parameter ranges are recorded; (f) a pending image is received and stored and a pending characteristic image is extracted from the pending image; a classifier and the pending image are used to determine a pending parameter; (g) when the pending parameter is larger than the threshold corresponding to the classifier, the pending image is classified into the class corresponding to the classifier; (h) when the pending parameter lies in the parameter ranges, the pending image is classified into the classes corresponding to the parameter ranges.

In an embodiment of the present disclosure, wherein the step (a) further includes: the first characteristic images are divided into a plurality of characteristic blocks, and a plurality of variances of the characteristic blocks is calculated; a plurality of characteristic variances in decrement order beginning with a maximum of the variances and the characteristic blocks corresponding to the characteristic variances are selected; the characteristic blocks are used to generate a plurality of classifiers corresponding to the classes through the linear mapping classifying method.

In an embodiment of the present disclosure, wherein the linear mapping classifying method is support vector machine algorithm; the parameter ranges and the threshold are all between −1 and 1.

In an embodiment of the present disclosure, wherein the steps (a), (b), and (f) include: the first characteristic images are extracted from the first training images through histogram of oriented gradients; the second characteristic images are extracted from the second training images through histogram of oriented gradients; the pending characteristic image is extracted from the pending image through histogram of oriented gradients.

In an embodiment of the present disclosure, wherein the step (d) includes: when the two parameter ranges overlap, the remaining parameter ranges are recorded except for the two parameter ranges; after one of the two classifiers corresponding to the two parameter ranges is selected as said another classifier, the step (c) is repeated until the parameter ranges don't overlap with each other.

In an embodiment of the present disclosure, wherein the first training images include a plurality of positive sample images and a plurality of negative sample images; there is an object respectively corresponding to the classes in the positive sample images, and there is a lack of the object respectively corresponding to the classes in the negative sample images.

In conclusion, the present disclosure originates from efficiency improvements of the binary classifying method with regard to multi-class object classification and achieves multi-class object classification with less classifying steps by recording the parameter ranges that are generated from training images of different classes and one of the classifiers; moreover, the present disclosure reduces the sample number, saves the operation time by dividing the characteristic images into image blocks and selecting the image blocks with higher variances as representative to generate classifiers through the linear mapping classifying method, and apparently improves the efficiency of the multi-class object classification.

The following is detailed description of the above-mentioned contents through embodiments, and provides further explanation of the technical aspects of the present disclosure.

BRIEF DESCRIPTION OF THE DRAWINGS

In order to make the above-mentioned contents, and other purposes, features, advantages, and embodiments more clear and understandable, with description made to the accompanying drawings as follows:

FIG. 4 is a schematic diagram of a multi-class object classifying system according to the second embodiment of the present disclosure.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure; orders of step description are not used to limit the execution sequence either. Any devices with equivalent effect through rearrangement are also covered by the present disclosure.

Figure 1A:
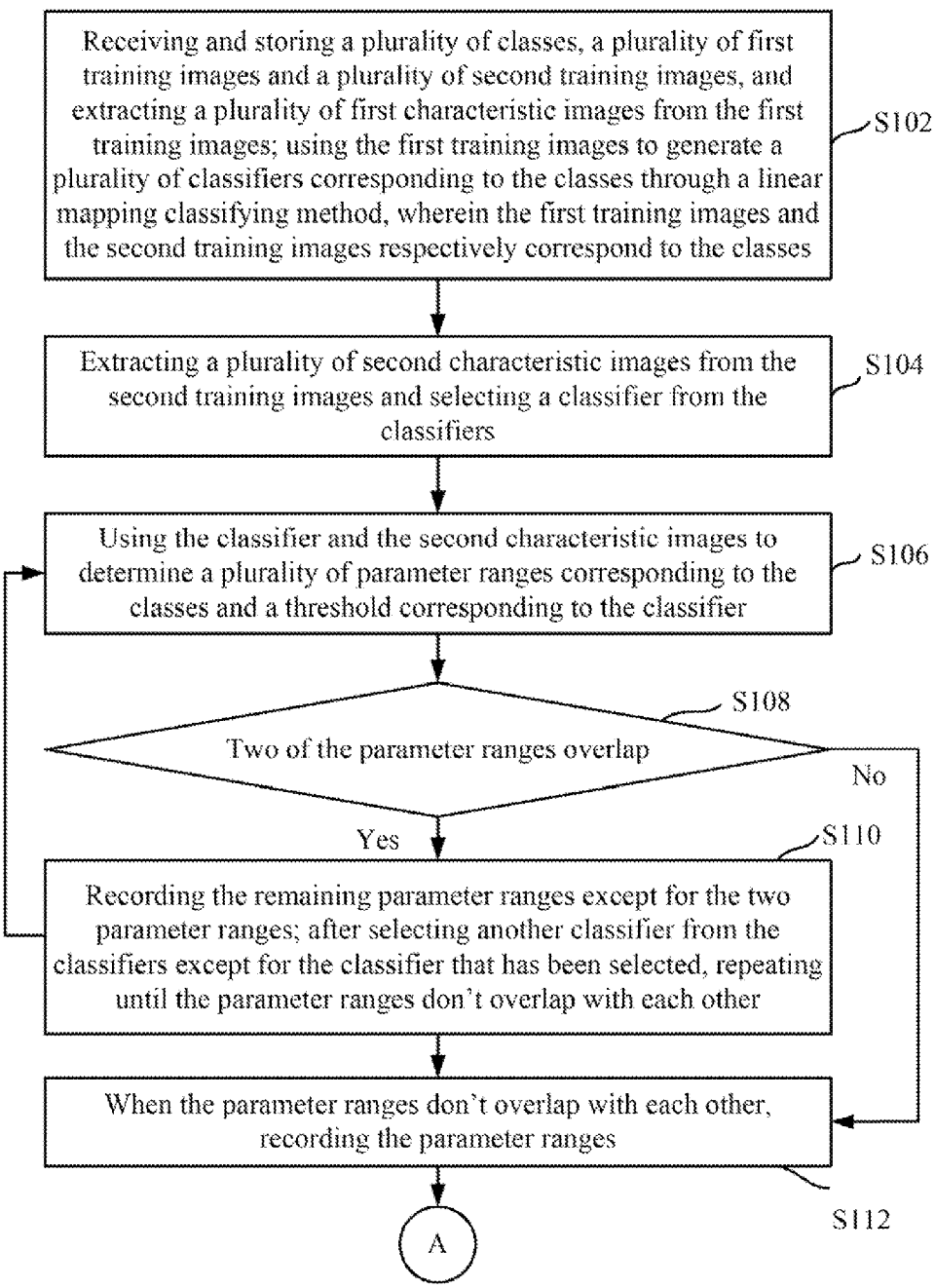
FIG. 1A-1B are flow charts of a multi-class object classifying method according to the first embodiment of the present disclosure.
Figure 1B:
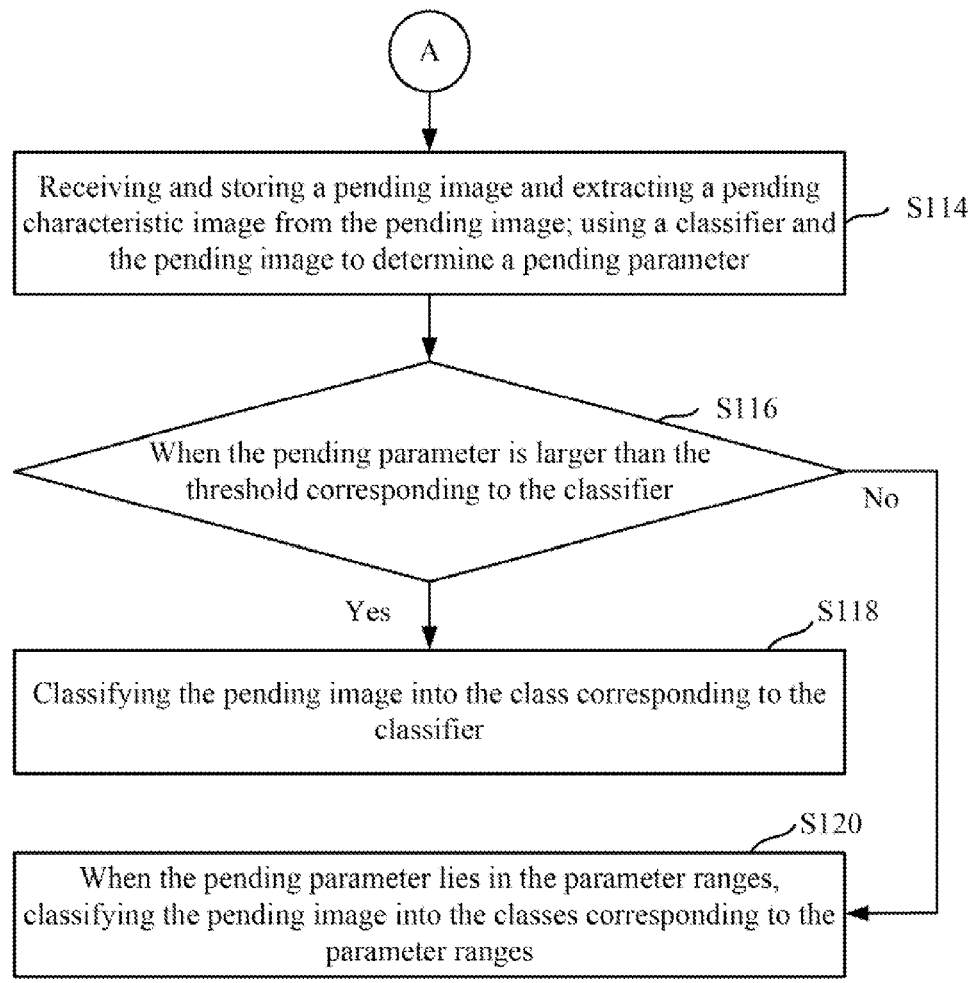

FIG. 1A-1B show flow charts of a multi-class object classifying method 100 according to the first embodiment of the present disclosure, and point A is a connection point of steps in FIG. 1A and FIG. 1B. The multi-class object classifying method 100 can be applied to a multi-class object classifying system 400 as shown in FIG. 4. The multi-class object classifying method 100 can be implemented as a computer program stored in a computer-readable medium, which is loaded by a computer to make the computer execute the multi-class object classifying method. The non-transitory computer-readable medium can be read only memory (ROM), flash memory, soft disk, hard disk, optical disk, pen drive, magnetic tape, network accessible database, or other computer-readable medium with the same function that are obvious for those skilled in the art. However, those skilled in the art should understand that the mentioned steps in the present embodiment are in an adjustable execution sequence according to the actual demands except for the steps in a specially described sequence, and even the steps or parts of the steps can be executed simultaneously.

First, in step S102, classes, first training images and second training images are received and stored; wherein the first training images and the second training images respectively correspond to the classes. For example, users can define classes A, B, C and D, and every class respectively has first training images and second training images. First characteristic images are extracted from the first training images to execute the first training stage and generate classifiers; wherein a linear mapping classifying method is used in the first training stage and the number of the classifiers equals to the number of the classes. In the present embodiment, the generated classifiers are classifiers A-D corresponding to classes A-D, and the classifiers have functions of distinguishing corresponding classes from non-corresponding classes. For example, classifier A can be used to distinguish class A from non-class A, and so on. Specifically, the linear mapping classifying method can be support vector machine algorithm, Fisher's liner discriminant, or naive Bayes classifier.

Then, in step S104, second characteristic images are extracted from the second training images and a classifier is selected from the classifiers to execute the second training stage. In step S106, the classifier and the second characteristic images are used to determine parameter ranges corresponding to the classes and a threshold corresponding to the classifier; for example, the parameter ranges are all between −1 and 1. The threshold can be defined as a standard of being classified into the class according to the demands; for example, the threshold of classifier A is defined as 0.8; class A is determined when a parameter is larger than 0.8; non-class A is determined when a parameter is smaller than 0.8.

The above-mentioned parameter ranges are determined through parameters calculated from characteristic values of second characteristic images in a class and parameters of the classifier. The equation is as follows:

$$\text{Sum} = -\rho + \sum_i [\alpha_i (S_i \cdot V_i)]$$

Figure 2:
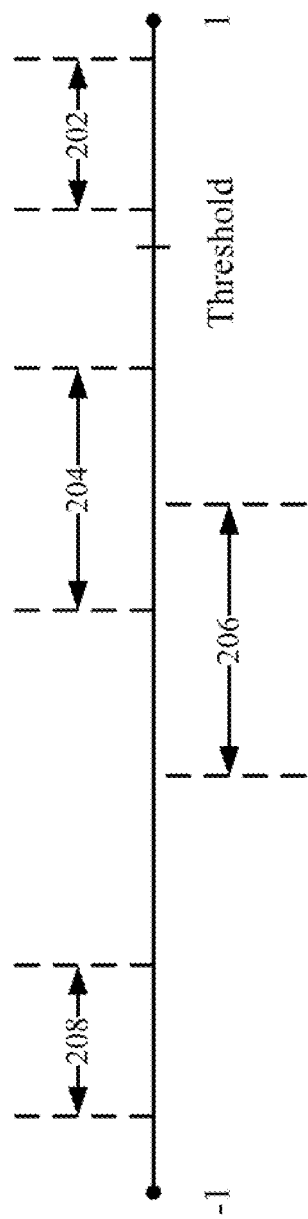
FIG. 2 is a schematic diagram of parameter ranges determined by the second training images respectively corresponding to the classes A-D and the parameters of classifier A.

In the above-mentioned equation: $S_i$ is the characteristic value of the second characteristic images, $V_i$, $\alpha_i$, $\rho$ are all the parameters of the selected classifier, Sum is the calculated parameter. Therefore, second characteristic images generate parameters through calculation and forms a parameter range. Parameter ranges corresponding to the classes are generated from the characteristic values of the second characteristic images corresponding to the classes and parameters of a classifier through the above-mentioned equation. As shown in FIG. 2, there are corresponding relation between the parameter ranges and the classes, wherein the parameter range corresponding to the same class as the classifier is nearest to 1.

Figure 3:
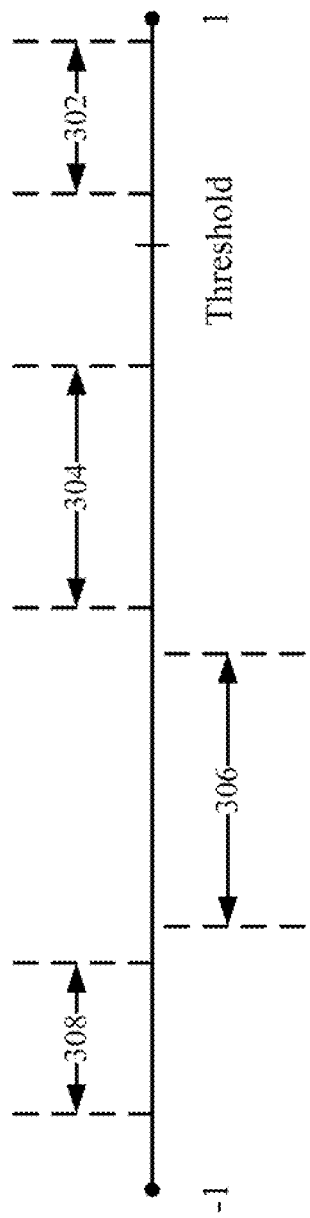
FIG. 3 is a schematic diagram of parameter ranges determined by the second training images respectively corresponding to the classes A-D and the parameters of classifier B.

In step S108, the parameter ranges are checked whether the parameter ranges overlap; when two of the parameter ranges overlap, the remaining parameter ranges are recorded except for the two parameter ranges; after another classifier is selected from the classifiers except for the classifier that has been selected, the step S106 is repeated until the parameter ranges don't overlap with each other (step S110); when the parameter ranges don't overlap with each other, the parameter ranges are recorded (step S112). For example, FIG. 2 is a schematic diagram of parameter ranges determined by the second training images respectively corresponding to the classes A-D and the parameters of classifier A. A parameter range 202 corresponding to class A is between the threshold and 1, parameter ranges 204-208 corresponding to classes B-D are between −1 and the threshold. The parameter range 204 corresponding to class B overlaps with the parameter range 206 corresponding to class C, which indicates that classifier A can't distinguish class B from class C appropriately; therefore, the distinguishable parameter range 202 corresponding to class A and parameter range 208 corresponding to class D are recorded; after one of the classifiers B-D is selected except for classifier A, the step S106 is repeated until all the parameter ranges don't overlap with each other and the non-overlapping parameter ranges are recorded. For example, FIG. 3 is a schematic diagram of parameter ranges determined by the second training images respectively corresponding to the classes A-D and the parameters of classifier B, and all the parameter ranges 302-308 don't overlap; therefore, the classifier B has a function of distinguishing classes A-D after recording the parameter ranges. Thus, any of the classifiers A-D has a potential of distinguishing classes A-D after recording the parameter ranges and improved capability of classification compared to the classifiers generated in the first training stage.

Detecting stage starts from step S114, a pending image is received and stored, and a pending characteristic image is extracted from the pending image; a classifier and the pending image are used to determine a pending parameter; in step 3116, the pending parameter is checked whether it is larger than the threshold corresponding to the classifier; when the pending parameter is larger than the threshold corresponding to the classifier, the pending image is classified into the class corresponding to the classifier (step S118); when the pending parameter is smaller than the threshold corresponding to the classifier, in step S120, the pending parameter is checked whether it lies in the parameter ranges corresponding to the classes; when the pending parameter lies in the parameter ranges, the pending image is classified into the classes corresponding to the parameter ranges. For example, parameters of classifier A and the pending characteristic image are used to determine the pending parameter through the above-mentioned equation. When the pending parameter is larger than the threshold of classifier A, the pending image is classified into the class A; when the pending parameter is smaller than the threshold of classifier A and lies in the parameter range of class B, then the pending image is classified into class B; when the pending parameter is smaller than the threshold of classifier A and lies in the parameter range of class C, then the pending image is classified into class C. In conclusion, the classifiers A-D have functions of distinguishing not only the classes corresponding to the classifiers but also other classes, and therefore a multi-class object classification with less steps and higher efficiency can be achieved.

In order to reduce the number of image samples used to generate classifiers, in an embodiment, the first characteristic images are divided into characteristic blocks, and variances of the characteristic blocks is calculated. Characteristic variances in decrement order beginning with a maximum of the variances and the characteristic blocks corresponding to the characteristic variances are selected. The characteristic blocks with large variances are selected to represent for the image, and then the characteristic blocks is used to generate classifiers corresponding to the classes through the linear mapping classifying method. The number of selected characteristic blocks is adjustable according to the demands so as to reduce the number of samples needed for generating the classifiers, and then the efficiency of operation is improved.

In an embodiment, the linear mapping classifying method is support vector machine algorithm. The first training images corresponding to classes are inputted into the support vector machine algorithm to determine hyperplanes that can distinguish corresponding classes from non-corresponding classes and then generate the classifiers corresponding to the classes.

In an alternative embodiment, characteristic images are extracted through histogram of oriented gradients; namely, the first characteristic images, the second characteristic images and the pending characteristic image are respectively extracted from the first training images, the second training images and the pending image through histogram of oriented gradients.

In an embodiment, when the two parameter ranges overlap, the remaining parameter ranges are recorded except for the two parameter ranges; after one of the two classifiers corresponding to the two parameter ranges is selected as said another classifier, the step S106 is repeated until the parameter ranges don't overlap with each other. For example, as shown in FIG. 2, the parameter range 202 corresponding to class A is between the threshold and 1, and the parameter ranges corresponding to B-D are between −1 and the threshold. The parameter range 204 corresponding to class B overlaps with the parameter range 206 corresponding to class C, which indicates that classifier A can't distinguish class B from class C appropriately; therefore, the distinguishable parameter range 202 corresponding to class A and parameter range 208 corresponding to class D are recorded, one of the classifiers B and C is selected, the step S106 is repeated until all the parameter ranges don't overlap with each other and the non-overlapping parameter ranges are recorded. Directly selecting from the classifiers B and C with overlapped parameter ranges is a faster way to find out the classifiers that can distinguish class B from class C.

In an embodiment, the first training images include positive sample images and negative sample images; there is an object respectively corresponding to the classes in the positive sample images, and there is a lack of the object respectively corresponding to the classes in the negative sample images. For example, in the process of generating classifier A, images with objects of class A is taken as the positive sample images, and images without objects of class A is taken as the negative sample images; therefore, images merely with objects of classes B-D can also be taken as the negative sample images to generate classifier A. The positive sample images and the negative sample images are inputted into the linear mapping classifying method to improve the recognizing functions of the generated classifiers.

FIG. 4 shows a multi-class object classifying system 400 according to the second embodiment of the present disclosure. The multi-class object classifying system 400 includes an input device 410, a database 420 and a processor 430. In practice, the input device 410 can be transmission port (for example: USB, GPIB, or other interfaces). The database 420 can be a hard disk, flash memory, or other storing media; the processor 430 can be CPUs, microprocessors or other circuits.

First, the input device 410 receives and stores user-defined classes 442, first training images 444, second training images 446 in the database 420; wherein the first training images 444 and the second training images 446 respectively correspond to the classes 442. For example, users can define classes A, B, C and D, and every class respectively has first training images 444 and second training images 446. First characteristic images is extracted from the first training images 444 to execute the first training stage and generate classifiers; wherein a linear mapping classifying method is used in the first training stage and the number of the classifiers equals to the number of the classes 442. In the present embodiment, the generated classifiers are classifiers A-D corresponding to classes A-D, and the classifiers have functions of distinguishing corresponding classes from non-corresponding classes. For example, classifier A can be used to distinguish class A from non-class A, and so on. Specifically, the linear mapping classifying method can be support vector machine algorithm, Fishers liner discriminant, or naive Bayes classifier.

Next, the processor 430 extracts second characteristic images from the second training images 446 and selects a classifier from the classifiers to execute the second training stage. The processor 430 uses the classifier and the second characteristic images to determine parameter ranges corresponding to the classes 442 and a threshold corresponding to the classifier; for example, the parameter ranges are all between −1 and 1. The threshold can be defined as a standard of being classified into the class according to the demands; for example, the threshold of classifier A is defined as 0.8; class A is determined when a parameter is larger than 0.8; non-class A is determined when a parameter is smaller than 0.8.

The above-mentioned parameter ranges are determined by the processor 430 through parameters calculated from characteristic values of second characteristic images in a class and parameters of the classifier. The equation is as follows:

$$\text{Sum} = -\rho + \sum_i [\alpha_i (S_i \cdot V_i)]$$

In the above-mentioned equation: $S_i$ is the characteristic value of the second characteristic images, $V_i$, $\alpha_i$, $\rho$ are all the parameters of the selected classifier, Sum is the calculated parameter. Therefore, second characteristic images generates parameters through calculation and forms a parameter range. Parameter ranges corresponding to the classes is generated from the characteristic values of the second characteristic images corresponding to the classes and parameters of a classifier through the above-mentioned equation. As shown in FIG. 2, there are corresponding relation between the parameter ranges and the classes, wherein the parameter range corresponding to the same class as the classifier is nearest to 1.

Next, the processor 430 checks the parameter ranges whether the parameter ranges overlap; when two of the parameter ranges overlap, the processor 430 records the remaining parameter ranges except for the two parameter ranges; after selecting another classifier from the classifiers except for the classifier that has been selected, the processor 430 repeats execution until the parameter ranges don't overlap with each other (step S110); when the parameter ranges don't overlap with each other, the processor 430 records the parameter ranges (step S112). For example, FIG. 2 is a schematic diagram of parameter ranges determined by the second training images respectively corresponding to the classes A-D and the parameters of classifier A. A parameter range 202 corresponding to class A is between the threshold and 1, parameter ranges 204-208 corresponding to classes B-D are between −1 and the threshold. The parameter range 204 corresponding to class B overlaps with the parameter range 206 corresponding to class C, which indicates that classifier A can't distinguish class B from class C appropriately; therefore, the processor 430 records the distinguishable parameter range 202 corresponding to class A and parameter range 208 corresponding to class D; after selecting one of the classifiers B-D except for classifier A, the processor 430 repeats execution until all the parameter ranges don't overlap with each other and records the non-overlapping parameter ranges. For example, FIG. 3 is a schematic diagram of parameter ranges determined by the second training images respectively corresponding to the classes A-D and the parameters of classifier B, and all the parameter ranges 302-308 don't overlap; therefore, the classifier B has a function of distinguishing classes A-D after the processor 430 records the parameter ranges. Thus, any of the classifiers A-D has a potential of distinguishing classes A-D after recording the parameter ranges and improved capability of classification compared to the classifiers generated in the first training stage.

The processor 430 receives and stores a pending image 448 in the database 420, extracts a pending characteristic image from the pending image 448, and uses a classifier and the pending image to determine a pending parameter. The processor 430 checks the pending parameter whether it is larger than the threshold corresponding to the classifier; when the pending parameter is larger than the threshold corresponding to the classifier, the processor 430 classifies the pending image 448 into the class corresponding to the classifier; when the pending parameter is smaller than the threshold corresponding to the classifier, the processor 430 checks the pending parameter whether it lies in the parameter ranges corresponding to the classes 442; when the pending parameter lies in the parameter ranges, the processor 430 classifies the pending image 448 into the classes 442 corresponding to the parameter ranges. For example, the processor 430 uses parameters of classifier A and the pending characteristic image to determine the pending parameter through the above-mentioned equation. When the pending parameter is larger than the threshold of classifier A, the processor 430 classifies the pending image 448 into the class A; when the pending parameter is smaller than the threshold of classifier A and lies in the parameter range of class B, then the processor 430 classifies the pending image 448 into class B; when the pending parameter is smaller than the threshold of classifier A and lies in the parameter range of class C, then the processor 430 classifies the pending image 448 into class C. In conclusion, the classifiers A-D have functions of distinguishing not only the classes corresponding to the classifiers but also other classes, and therefore a multi-class object classification with less steps and higher efficiency can be achieved.

In order to reduce the number of image samples used to generate classifiers, in an embodiment, the processor 430 divides the first characteristic images into characteristic blocks, and calculates variances of the characteristic blocks. The processor 430 selects characteristic variances in decrement order beginning with a maximum of the variances and the characteristic blocks corresponding to the characteristic variances. The processor 430 selects the characteristic blocks with large variances to represent for the image, and then uses the characteristic blocks to generate classifiers corresponding to the classes through the linear mapping classifying method. The number of selected characteristic blocks is adjustable according to the demands so as to reduce the number of samples needed for generating the classifiers, and then the efficiency of operation is improved.

In an embodiment, the linear mapping classifying method is support vector machine algorithm. The first training images corresponding to classes are inputted into the support vector machine algorithm to determine hyperplanes that can distinguish corresponding classes from non-corresponding classes and then the processor 430 generates the classifiers corresponding to the classes.

In an alternative embodiment, the processor 430 extracts characteristic images through histogram of oriented gradients; namely, the processor 430 respectively extracts the first characteristic images, the second characteristic images and the pending characteristic image from the first training images 444, the second training images 446 and the pending image 448 through histogram of oriented gradients.

In an embodiment, when the two parameter ranges overlap, the processor 430 records the remaining parameter ranges except for the two parameter ranges; after selecting one of the two classifiers corresponding to the two parameter ranges as said another classifier, the processor 430 repeats execution until the parameter ranges don't overlap with each other. For example, as shown in FIG. 2, the parameter range 202 corresponding to class A is between the threshold and 1, and the parameter ranges corresponding to B-D are between −1 and the threshold. The parameter range 204 corresponding to class B overlaps with the parameter range 206 corresponding to class C, which indicates that classifier A can't distinguish class B from class C appropriately; therefore, the processor 430 records the distinguishable parameter range 202 corresponding to class A and parameter range 208 corresponding to class D, selects one of the classifiers B and C, repeats execution until all the parameter ranges don't overlap with each other and records the non-overlapping parameter ranges. Directly selecting from the classifiers B and C with overlapped parameter ranges is a faster way to find out the classifiers that can distinguish class B from class C.

In an embodiment, the first training images include positive sample images and negative sample images; there is an object respectively corresponding to the classes in the positive sample images, and there is a lack of the object respectively corresponding to the classes in the negative sample images. For example, in the process of generating classifier A, the processor 430 takes images with objects of class A as the positive sample images and takes images without objects of class A as the negative sample images; therefore, images merely with objects of classes B-D can also be taken as the negative sample images to generate classifier A. The positive sample images and the negative sample images are inputted into the linear mapping classifying method to improve the recognizing functions of the classifiers generated by the processor 430.

In conclusion, the present disclosure can record the parameter ranges that are generated from training images of different classes and one of the classifiers through the above-mentioned embodiments so as to achieve multi-class object classification with less classifying steps; moreover, the present disclosure reduces the sample number, saves the operation time by dividing the characteristic images into image blocks and selecting the image blocks with higher variances as representative to generate classifiers through the linear mapping classifying method, and apparently improves the efficiency of the multi-class object classification.

Even though the present disclosure is disclosed as above, the disclosure not used to limit the present disclosure. It will be apparent to those skilled in the art that various modifications and variations can be made to the present disclosure without departing from the spirit or scope of the invention; thus, it is intended that the range protected by the present disclosure should refer to the scope of the following claims.

What is claimed is:

1. A multi-class object classifying method, comprising:
   (a) receiving and storing a plurality of classes, a plurality of first training images and a plurality of second training images, extracting a plurality of first characteristic images from the first training images, and using the first training images to generate a plurality of classifiers corresponding to the classes through a linear mapping classifying method, wherein the first training images and the second training images respectively correspond to the classes;
   (b) extracting a plurality of second characteristic images from the second training images and selecting a classifier from the classifiers;
   (c) using the classifier and the second characteristic images to determine a plurality of parameter ranges corresponding to the classes and a threshold corresponding to the classifier;
   (d) when two of the parameter ranges overlap, recording the remaining parameter ranges except for the two parameter ranges, and after selecting another classifier from the classifiers except for the classifier that has been selected, repeating the step (c) until the parameter ranges don't overlap with each other;
   (e) when the parameter ranges don't overlap with each other, recording the parameter ranges;
   (f) receiving and storing a pending image and extracting a pending characteristic image from the pending image, and using a classifier and the pending image to determine a pending parameter;
   (g) when the pending parameter is larger than the threshold corresponding to the classifier, classifying the pending image into the class corresponding to the classifier; and
   (h) when the pending parameter lies in the parameter ranges, classifying the pending image into the classes corresponding to the parameter ranges.

2. The multi-class object classifying method of claim 1, wherein the step (a) further comprises:
   dividing the first characteristic images into a plurality of characteristic blocks, and calculating a plurality of variances of the characteristic blocks;
   selecting a plurality of characteristic variances in decrement order beginning with a maximum of the variances and the characteristic blocks corresponding to the characteristic variances; and
   using the characteristic blocks to generate a plurality of classifiers corresponding to the classes through the linear mapping classifying method.

3. The multi-class object classifying method of claim 2, wherein the linear mapping classifying method is support vector machine algorithm, and the parameter ranges and the threshold are all between −1 and 1.

4. The multi-class object classifying method of claim 2, wherein the steps (a), (b), and (f) comprise:
   extracting the first characteristic images from the first training images through histogram of oriented gradients;
   extracting the second characteristic images from the second training images through histogram of oriented gradients; and
   extracting the pending characteristic image from the pending image through histogram of oriented gradients.

5. The multi-class object classifying method of claim 2, wherein the step (d) comprises:
   when the two parameter ranges overlap, recording the remaining parameter ranges except for the two parameter ranges; and
   after selecting one of the two classifiers corresponding to the two parameter ranges as said another classifier, repeating the step (c) until the parameter ranges don't overlap with each other.

6. The multi-class object classifying method of claim 2, wherein the first training images comprise a plurality of positive sample images and a plurality of negative sample images, there is an object respectively corresponding to the classes in the positive sample images, and there is a lack of the object respectively corresponding to the classes in the negative sample images.

7. A multi-class object classifying system, comprising:
   an input device configured to receive a plurality of classes, a plurality of first training images, a plurality of second training images and a pending image, wherein the first training images and the second training images respectively correspond to the classes;
   a database coupled to the input device and configured to store the classes, the first training images, the second training images and the pending image; and
   a processor coupled to the database and configured to execute following steps:
   (a) extracting a plurality of first characteristic images from the first training images, and using the first training images to generate a plurality of classifiers corresponding to the classes through a linear mapping classifying method;
(b) extracting a plurality of second characteristic images from the second training images and selecting a classifier from the classifiers;
(c) using the classifier and the second characteristic images to determine a plurality of parameter ranges corresponding to the classes and a threshold corresponding to the classifier;
(d) when two of the parameter ranges overlap, recording the remaining parameter ranges except for the two parameter ranges, and after selecting another classifier from the classifiers except for the classifier that has been selected, repeating the step (c) until the parameter ranges don't overlap with each other;
(e) when the parameter ranges don't overlap with each other, recording the parameter ranges;
(f) receiving and storing a pending image and extracting a pending characteristic image from the pending image, and using a classifier and the pending image to determine a pending parameter;
(g) when the pending parameter is larger than the threshold corresponding to the classifier, classifying the pending image into the class corresponding to the classifier; and
(h) when the pending parameter lies in the parameter ranges, classifying the pending image into the classes corresponding to the parameter ranges.

8. The multi-class object classifying system of claim 7, wherein the processor divides the first characteristic images into a plurality of characteristic blocks, calculates a plurality of variances of the characteristic blocks, selects a plurality of characteristic variances in decrement order beginning with a maximum of the variances and the characteristic blocks corresponding to the characteristic variances, and uses the characteristic blocks to generate a plurality of classifiers corresponding to the classes through the linear mapping classifying method.

9. The multi-class object classifying system of claim 8, wherein the linear mapping classifying method is support vector machine algorithm, and the parameter ranges and the threshold are all between −1 and 1.

10. The multi-class object classifying system of claim 8, wherein the processor extracts the first characteristic images from the first training images through histogram of oriented gradients, extracts the second characteristic images from the second training images through histogram of oriented gradients, and extracts the pending characteristic image from the pending image through histogram of oriented gradients.

11. The multi-class object classifying system of claim 8, wherein when the two parameter ranges overlap, the processor records the remaining parameter ranges except for the two parameter ranges, and after selecting one of the two classifiers corresponding to the two parameter ranges as said another classifier, the processor repeats the step (c) until the parameter ranges don't overlap with each other.

12. The multi-class object classifying system of claim 8, wherein the first training images comprise a plurality of positive sample images and a plurality of negative sample images, there is an object respectively corresponding to the classes in the positive sample images, and there is a lack of the object respectively corresponding to the classes in the negative sample images.

13. A non-transitory computer-readable storage medium storing a program that is loaded and executed by a computer, performs a multi-class object classifying method, comprising:

(a) receiving and storing a plurality of classes, a plurality of first training images and a plurality of second training images, and extracting a plurality of first characteristic images from the first training images, and using the first training images to generate a plurality of classifiers corresponding to the classes through a linear mapping classifying method, wherein the first training images and the second training images respectively correspond to the classes;
(b) extracting a plurality of second characteristic images from the second training images and selecting a classifier from the classifiers;
(c) using the classifier and the second characteristic images to determine a plurality of parameter ranges corresponding to the classes and a threshold corresponding to the classifier;
(d) when two of the parameter ranges overlap, recording the remaining parameter ranges except for the two parameter ranges, and after selecting another classifier from the classifiers except for the classifier that has been selected, repeating the step (c) until the parameter ranges don't overlap with each other;
(e) when the parameter ranges don't overlap with each other, recording the parameter ranges;
(f) receiving and storing a pending image and extracting a pending characteristic image from the pending image, and using a classifier and the pending image to determine a pending parameter;
(g) when the pending parameter is larger than the threshold corresponding to the classifier, classifying the pending image into the class corresponding to the classifier; and
(h) when the pending parameter lies in the parameter ranges, classifying the pending image into the classes corresponding to the parameter ranges.

14. The non-transitory computer readable storage medium of claim 13, wherein the step (a) further comprises:
dividing the first characteristic images into a plurality of characteristic blocks, and calculating a plurality of variances of the characteristic blocks;
selecting a plurality of characteristic variances in decrement order beginning with a maximum of the variances and the characteristic blocks corresponding to the characteristic variances; and
using the characteristic blocks to generate a plurality of classifiers corresponding to the classes through the linear mapping classifying method.

15. The non-transitory computer readable storage medium of claim 14, wherein the linear mapping classifying method is support vector machine algorithm, and the parameter ranges and the threshold are all between −1 and 1.

16. The non-transitory computer readable storage medium of claim 14, wherein the steps (a), (b), and (f) comprise:
extracting the first characteristic images from the first training images through histogram of oriented gradients;
extracting the second characteristic images from the second training images through histogram of oriented gradients; and
extracting the pending characteristic image from the pending image through histogram of oriented gradients.

17. The non-transitory computer readable storage medium of claim 14, wherein the step (d) comprises:
when the two parameter ranges overlap, recording the remaining parameter ranges except for the two parameter ranges; and after selecting one of the two classifiers corresponding to the two parameter ranges as said another classifier, repeating the step (c) until the parameter ranges don't overlap with each other.

18. The non-transitory computer readable storage medium of claim 14, wherein the first training images comprise a plurality of positive sample images and a plurality of negative sample images, there is an object respectively corresponding to the classes in the positive sample images, and there is a lack of the object respectively corresponding to the classes in the negative sample images.

\* \* \* \* \*